(12) United States Patent
Liu (10) Patent No.: US 8,766,957 B2
(45) Date of Patent: Jul. 1, 2014

(54) DISPLAY DEVICE AND REPAIRING METHOD FOR THE SAME

(75) Inventor: Chi-chao Liu, Erlun Shiang (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 632 days.

(21) Appl. No.: 12/983,113

(22) Filed: Dec. 31, 2010

(65) Prior Publication Data

US 2012/0092306 A1 Apr. 19, 2012

(30) Foreign Application Priority Data

Oct. 15, 2010 (TW) .............................. 99135324 A (51) Int. Cl.
*G06F 3/038* (2013.01)
*G09G 5/00* (2006.01)

(52) U.S. Cl.
USPC ............... 345/204; 349/54; 349/40; 349/192; 349/143; 257/59; 345/904

(58) Field of Classification Search
None
See application file for complete search history.

(56) References Cited

U.S. PATENT DOCUMENTS

| | | | | |
|---|---|---|---|---|
| 5,285,301 | A * | 2/1994 | Shirahashi et al. ........... | 349/143 |
| 5,969,779 | A * | 10/1999 | Kim et al. ...................... | 349/54 |
| 6,317,176 | B1 * | 11/2001 | Kim et al. ...................... | 349/54 |
| 6,380,992 | B1 * | 4/2002 | Lee ................................ | 349/54 |
| 6,618,101 | B1 * | 9/2003 | Kim et al. ...................... | 349/54 |
| 6,943,374 | B1 * | 9/2005 | Park .............................. | 257/72 |
| 2002/0101547 | A1 * | 8/2002 | Lee et al. ...................... | 349/40 |
| 2003/0184225 | A1 * | 10/2003 | Namiki et al. ................ | 313/582 |
| 2007/0046845 | A1 * | 3/2007 | Liou et al. ..................... | 349/40 |

FOREIGN PATENT DOCUMENTS

| TW | I285767 | 8/2007 |
|---|---|---|
| TW | 200739181 | 10/2007 |
| TW | 200905339 | 2/2009 |
| TW | I319104 | 1/2010 |

* cited by examiner

*Primary Examiner* — Jesus Hernandez
(74) *Attorney, Agent, or Firm* — Cheng-Ju Chiang (57) ABSTRACT

A display device and a repairing method for the same are disclosed. The display device includes a substrate, a pixel array, at least one gate driver unit, at least one source driver unit, a first repair line, a second repair line, a first dummy line, and a second dummy line. The first repair line is disposed between the pixel array and the source driver unit. The second repair line is disposed opposite to the first repair line on the pixel array. The first dummy line and the second dummy line are respectively disposed at two sides of the pixel array and crossing the gate lines, the first repair line, and the second repair line. A signal transmission is not required to go around the outmost periphery of the gate driver unit in a repairing process. As a result, the signal attenuation can be decreased effectively.

4 Claims, 7 Drawing Sheets

DISPLAY DEVICE AND REPAIRING METHOD FOR THE SAME

BACKGROUND OF THE INVENTION

1. Field of the Invention

The present invention generally relates to a display device, and more particularly to a display device having repair lines and a repairing method for the same.

2. Description of Prior Art

Figure 1:
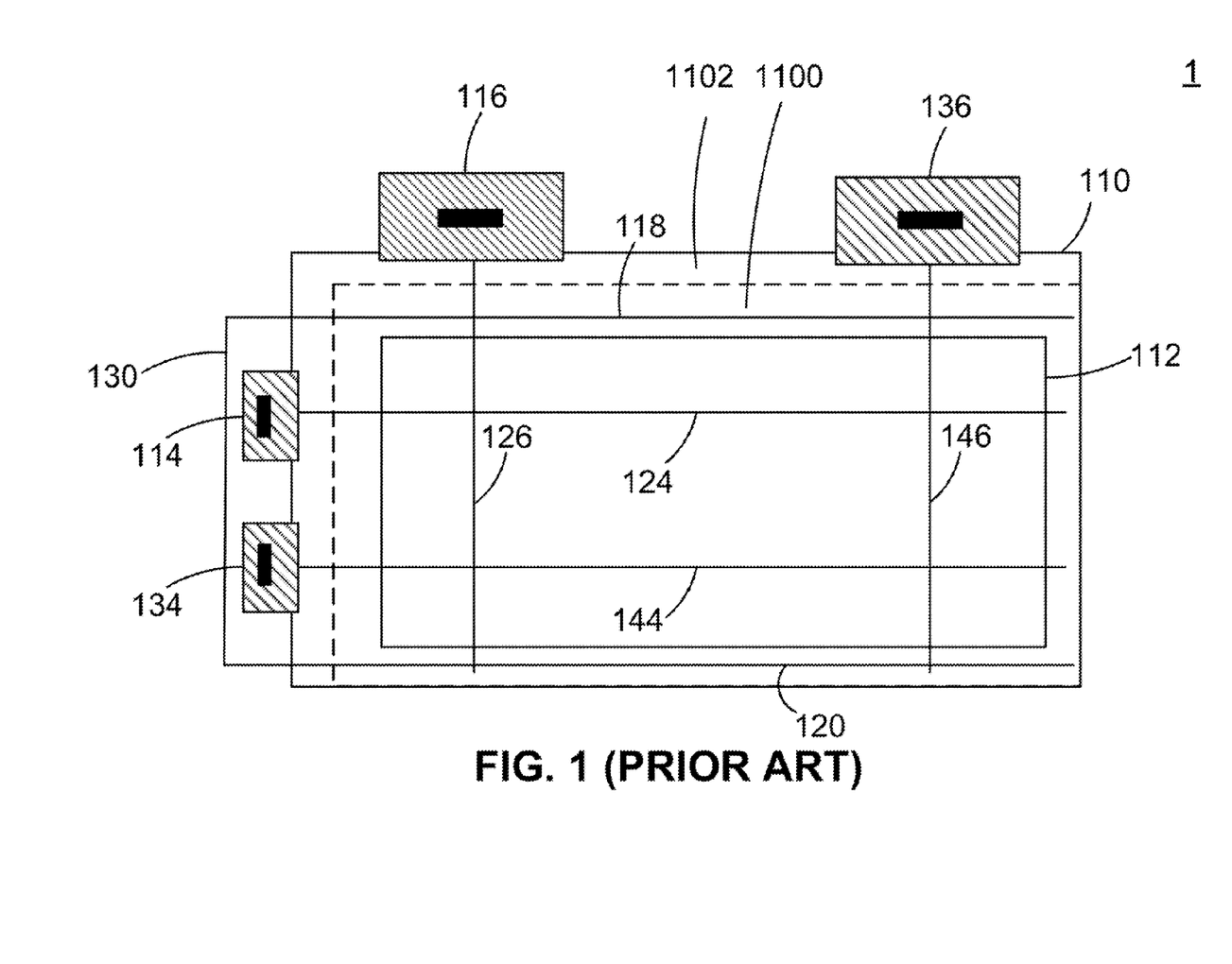
FIG. 1 illustrates a conventional display device.

Please refer to FIG. 1, which illustrates a conventional display device 1. The display device 1 comprises a substrate 110, a pixel array 112, two gate driver units 114, 134, two source driver units 116, 136, a first repair line 118, a second repair line 120, and a third repair line 130.

The substrate 110 comprises a display area 1100 and a non-display area 1102. The pixel array 112 is disposed on the display area 1100 and comprises a plurality of gate lines 124, 144, and a plurality of source lines 126, 146. The gate lines 124, 144, and the source lines 126, 146, cross each other. The gate driver units 114, 134, are disposed on the non-display area 1102. The gate driver units 114, 134, are electrically connected to the gate lines 124, 144, for driving the gate lines 124, 144, respectively. The source driver units 116, 136, are also disposed on the non-display area 1102. The source driver units 116, 136, are electrically connected to the source lines 126, 146, for providing display data to the source lines 126, 146, respectively. The first repair line 118 is disposed between the pixel array 112 and the source driver units 116, 136. The first repair line 118 crosses but does not contact the source lines 126, 146, that is, the first repair line 118 is not electrically connected to the source lines 126, 146. The second repair line 120 is disposed opposite to the first repair line 118 on the pixel array 112. The second repair line 120 crosses but does not contact the source lines 126, 146, that is, the second repair line 120 is not electrically connected to the source lines 126, 146. The third repair line 130 is disposed on the outmost periphery of the gate driver units 114, 134, and two ends of the third repair line 130 are electrically connected to the first repair line 118 and the second repair line 120, respectively.

Figure 2:
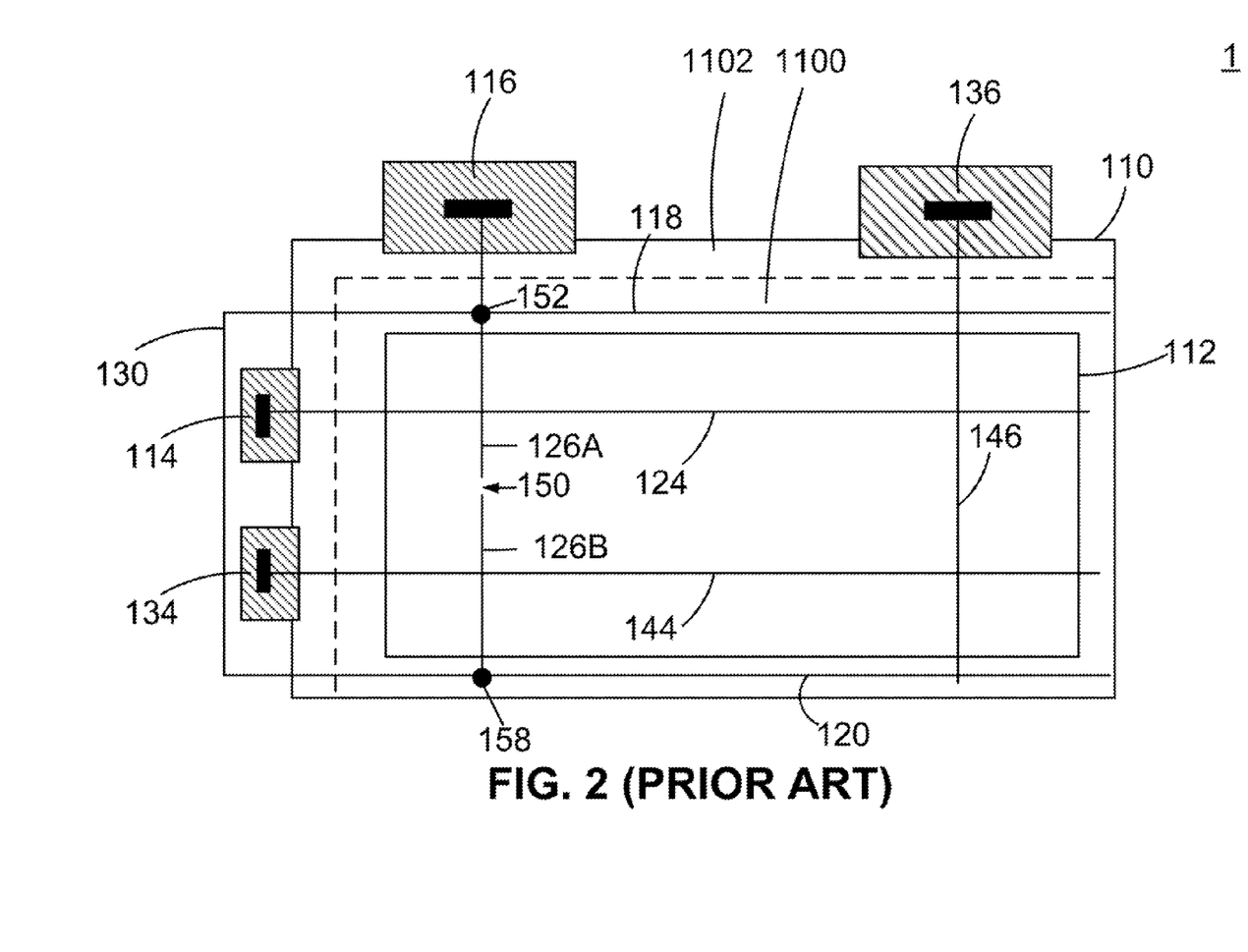
FIG. 2 is a diagram illustrating repairing a source line in the conventional display device.

Please refer to FIG. 2, which is a diagram illustrating repairing the source line 126 in the conventional display device 1. When the source line 126 has a defect 150 (e.g. a disconnected point), the source line 126 is divided into a first source line section 126A and a second source line section 126B. The first source line section 126A still can receive signals from the source driver unit 116, but the second source line section 126B cannot receive the signals from the source driver unit 116 owing to the defect 150. As a result, the image quality of the display device 1 will be affected because the second source line section 126B fails to receive correct data.

To repair the first source line 126, an overlapping position between the first source line section 126A and the first repair line 118 (i.e. a welding point 152) and an overlapping position between the second source line section 126B and the second repair line 120 (i.e. a welding point 158) are welded by laser. As a result, not only the first source line section 126A can receive the signals from the source driver unit 116, but also the second source line section 126B can receive the signals from the source driver unit 116 via the first repair line 118, the third repair line 130, and the second repair line 120.

However, when the source line section 126B receives the signals from the source driver unit 116 via the first repair line 118, the third repair line 130, and the second repair line 120, a transmission path of the signals goes around the outmost periphery of the gate driver units 114, 134. Therefore, the signals will attenuate because the transmission path is longer.

The signal attenuation problem is more serious especially in a larger size display panel, and accordingly the repair effect is not good.

Therefore, there is a need for a solution to the above-mentioned problem of signal attenuation in the conventional repair line structure.

SUMMARY OF THE INVENTION

An objective of the present invention is to provide a display device and a repairing method for the same, which are capable of decreasing signal attenuation due to a longer transmission path of repair lines.

To accomplish the invention objective, the display device according to the present invention comprises a substrate, a pixel array, at least one gate driver unit, at least one source driver unit, a first repair line, a second repair line, a first dummy line, and a second dummy line. The substrate comprises a display area and a non-display area. The pixel array is disposed on the display area. The pixel array comprises a plurality of gate lines and a plurality of source lines. The at least one gate driver unit is disposed on the non-display area for driving the gate lines. The at least one source driver unit is disposed on the non-display area for providing display data to the source lines. The first repair line is disposed between the pixel array and the at least one source driver unit, and the first repair line crosses the source lines. The first repair line in an initial state is electrically insulated from the source lines. The second repair line is disposed opposite to the first repair line on the pixel array, and the second repair line crosses the source lines. The second repair line in an initial state is electrically insulated from the source lines. The first dummy line is disposed at one side of the pixel array, and the first dummy line crosses the gate lines, the first repair line, and the second repair line. The first dummy line in an initial state is electrically insulated from the gate lines, the first repair line, and the second repair line. The second dummy line is disposed opposite to the first dummy line on the pixel array, and the second dummy line crosses the gate lines, the first repair line, and the second repair line. The second dummy line in an initial state is electrically insulated from the gate lines, the first repair line, and the second repair line.

In the repairing method for the display device according to the present invention, the display device comprises a pixel array, at least one gate driver unit, and at least one source driver unit. The pixel array comprises a plurality of gate lines and a plurality of source lines. One of the source lines are divided into a first source line section and a second source line section. The first source line section and the second source line section are discrete. The first source line section is electrically connected to the at least one source driver unit. The repairing method comprises steps below.

A first repair line disposed between the pixel array and the at least one source driver unit, a second repair line disposed opposite to the first repair line on the pixel array, a first dummy line disposed at one side of the pixel array, and a second dummy line disposed opposite to the first dummy line on the pixel array are provided. The first repair line crosses the source lines and in an initial state is electrically insulated from the source lines. The second repair line crosses the source lines and in an initial state is electrically insulated from the source lines. The first dummy line crosses the gate lines, the first repair line, and the second repair line. The first dummy line in an initial state is electrically insulated from the gate lines, the first repair line, and the second repair line. The second dummy line crosses the gate lines, the first repair line, and the second repair line. The second dummy line in an initial state is insulated from the gate lines, the first repair line, and the second repair line.

The first source line section is electrically connected to the first repair line.

The second source line section is electrically connected to the second repair line.

The first repair line and the second repair line are electrically connected to either the first dummy line or the second dummy line.

The first repair line and the second repair line are cut to electrically connect the first source line section to the second source line section via a portion of the first repair line, either the first dummy line or the second dummy line, and a portion of the second repair line.

In the repairing method for the display device according to the present invention, the display device comprises a pixel array, at least one gate driver unit, and at least one source driver unit. The pixel array comprises a plurality of gate lines and a plurality of source lines. One of the gate lines is divided into a first gate line section and a second gate line section. The first gate line section and the second gate line section are discrete. The first gate line section is electrically connected to the at least one gate driver unit. The repairing method comprises steps below.

A first repair line disposed between the pixel array and the at least one source driver unit, a second repair line disposed opposite to the first repair line on the pixel array, a first dummy line disposed at one side of the pixel array, and a second dummy line disposed opposite to the first dummy line on the pixel array are provided. The first repair line crosses the source lines and in an initial state is electrically insulated from the source lines. The second repair line crosses the source lines and in an initial state is electrically insulated from the source lines. The first dummy line crosses the gate lines, the first repair line, and the second repair line. The first dummy line in an initial state is electrically insulated from the gate lines, the first repair line, and the second repair line. The second dummy line crosses the gate lines, the first repair line, and the second repair line. The second dummy line in an initial state is insulated from the gate lines, the first repair line, and the second repair line.

The first gate line section is electrically connected to the first dummy line.

The second gate line section is electrically connected to the second dummy line.

The first dummy line and the second dummy line are electrically connected to either the first repair line or the second repair line.

The first dummy line and the second dummy line are cut to electrically connect the first gate line section to the second gate line section via a portion of the first dummy line, either the first repair line or the second repair line, and a portion of the second dummy line.

The display device and the repairing method for the same utilize the first dummy line and the second dummy line as auxiliary repair lines, so that a signal transmission of the repair lines is not required to go around the outmost periphery of the gate driver unit. As a result, the signal attenuation can be decreased effectively, especially in a larger size display panel.

DETAILED DESCRIPTION OF THE INVENTION

Figure 3:
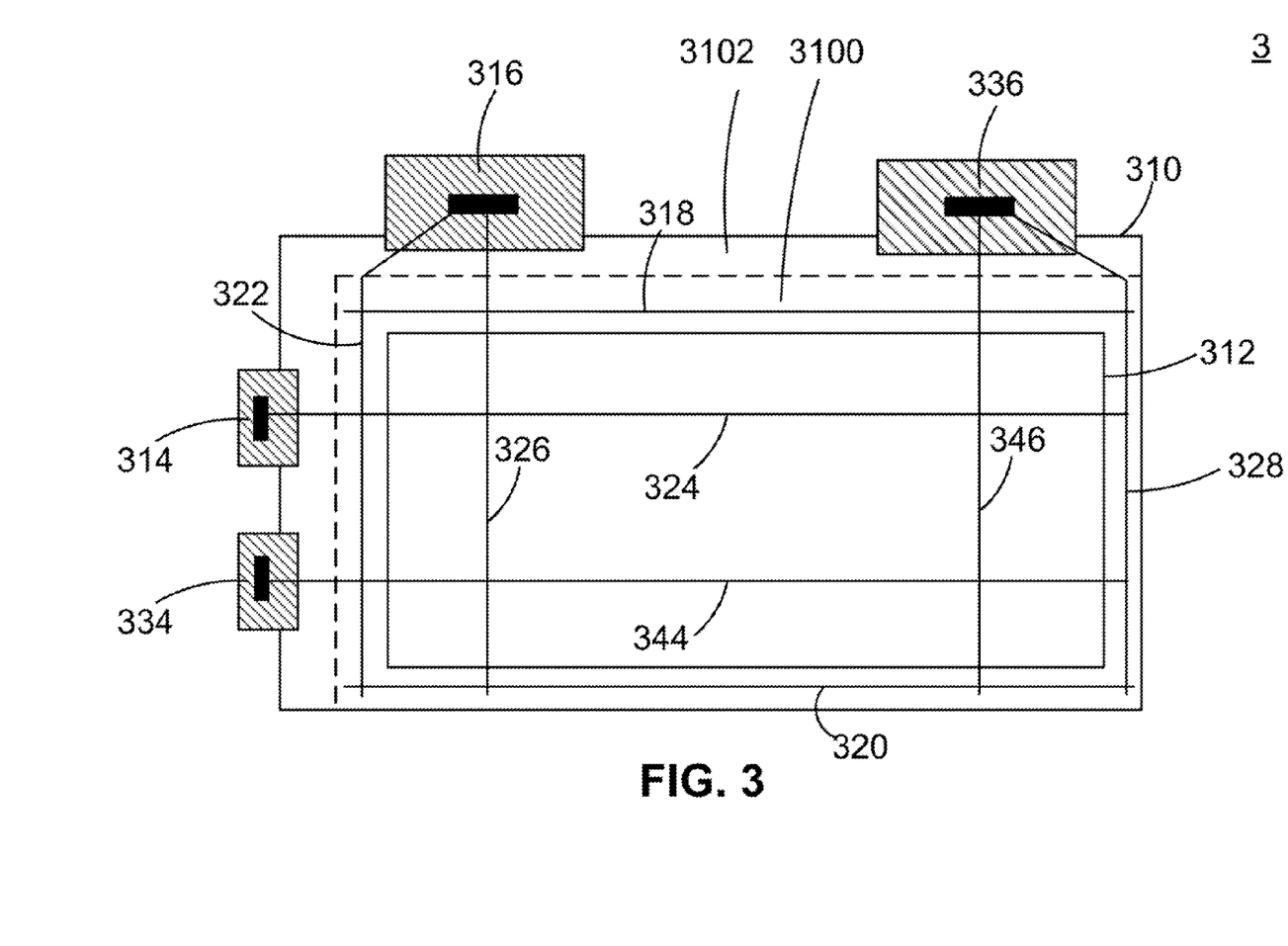
FIG. 3 is a schematic diagram showing a display device according to the present invention.

Please refer to FIG. 3, which is a schematic diagram showing a display device 3 according to the present invention. The display device 3 comprises a substrate 310, a pixel array 312, at least one gate driver unit (represented by gate driver units 314, 334, in FIG. 3), at least one source driver unit (represented by source driver units 316, 336, in FIG. 3), a first repair line 318, a second repair line 320, a first dummy line 322, and a second dummy line 328.

The substrate 310 comprises a display area 3100 and a non-display area 3102 which is adjacent to the display area 3100. The pixel array 312 is disposed on the display area 3100 for displaying images. The pixel array 312 comprises a plurality of gate lines (represented by gate lines 324, 344, in FIG. 3), a plurality of source lines (represented by source lines 326, 346, in FIG. 3), and a plurality of pixels (not shown). The gate lines 324, 344, and the source lines 326, 346, cross each other. Each one of the pixels (not shown) is corresponding to one of the gate lines 324, 344, and one of the source lines 326, 346. The gate driver units 314, 334, are disposed on the non-display area 3102, and the gate driver units 314, 334, are electrically connected to the gate lines 324, 344, for driving the gate lines 324, 344, respectively. The source driver units 316, 336, are also disposed on the non-display area 3102, and the source driver units 316, 336, are electrically connected to the source lines 326, 346, for providing display data to the source lines 326, 346, respectively. The first repair line 318 is disposed between the pixel array 312 and the source driver units 316, 336, and the first repair line 318 crosses but does not contact the source lines 326, 346. The first repair line 318 in an initial state is electrically insulated from the source lines 326, 346, that is, the first repair line 318 in an initial state is not electrically connected to the source lines 326, 346. The second repair line 320 is disposed opposite to the first repair line 318 on the pixel array 312, and the second repair line 320 crosses but does not contact the source lines 326, 346. The second repair line 320 in an initial state is electrically insulated from the source lines 326, 346, that is, the second repair line 320 in an initial state is not electrically connected to the source lines 326, 346.

The first dummy line 322 and the second dummy line 328 are disposed at two sides of the pixel array 312. The first dummy line 322 is disposed between the pixel array 312 and the gate driver units 314, 334. One end of the first dummy line 322 is electrically connected to the source driver unit 316. In one preferred embodiment, the first dummy line 322 is disposed on the display area 3100. The first dummy line 322 crosses but does not contact the gate lines 324,344, the first repair line 318, and the second repair line 320. The first dummy line 322 in an initial state is electrically insulated from the gate lines 324, 344, the first repair line 318, and the second repair line 320. That is, the first dummy line 322 in an initial state is not electrically connected to the gate lines 324, 344, the first repair line 318, and the second repair line 320.

The second dummy line 328 is disposed apart from the gate driver units 314, 334, that is, opposite to the first dummy line 322 on the pixel array 312. The second dummy line 328 is electrically connected to the source driver unit 336. In one preferred embodiment, the second dummy line 328 is disposed on the display area 3100. The second dummy line 328 crosses but does not contact the gate lines 324, 344, the first repair line 318, and the second repair line 320. The second dummy line 328 in an initial state is electrically insulated from the gate lines 324, 344, the first repair line 318, and the second repair line 320. That is, the second dummy line 328 in an initial state is not electrically connected to the gate lines 324, 344, the first repair line 318, and the second repair line 320.

Figure 4:
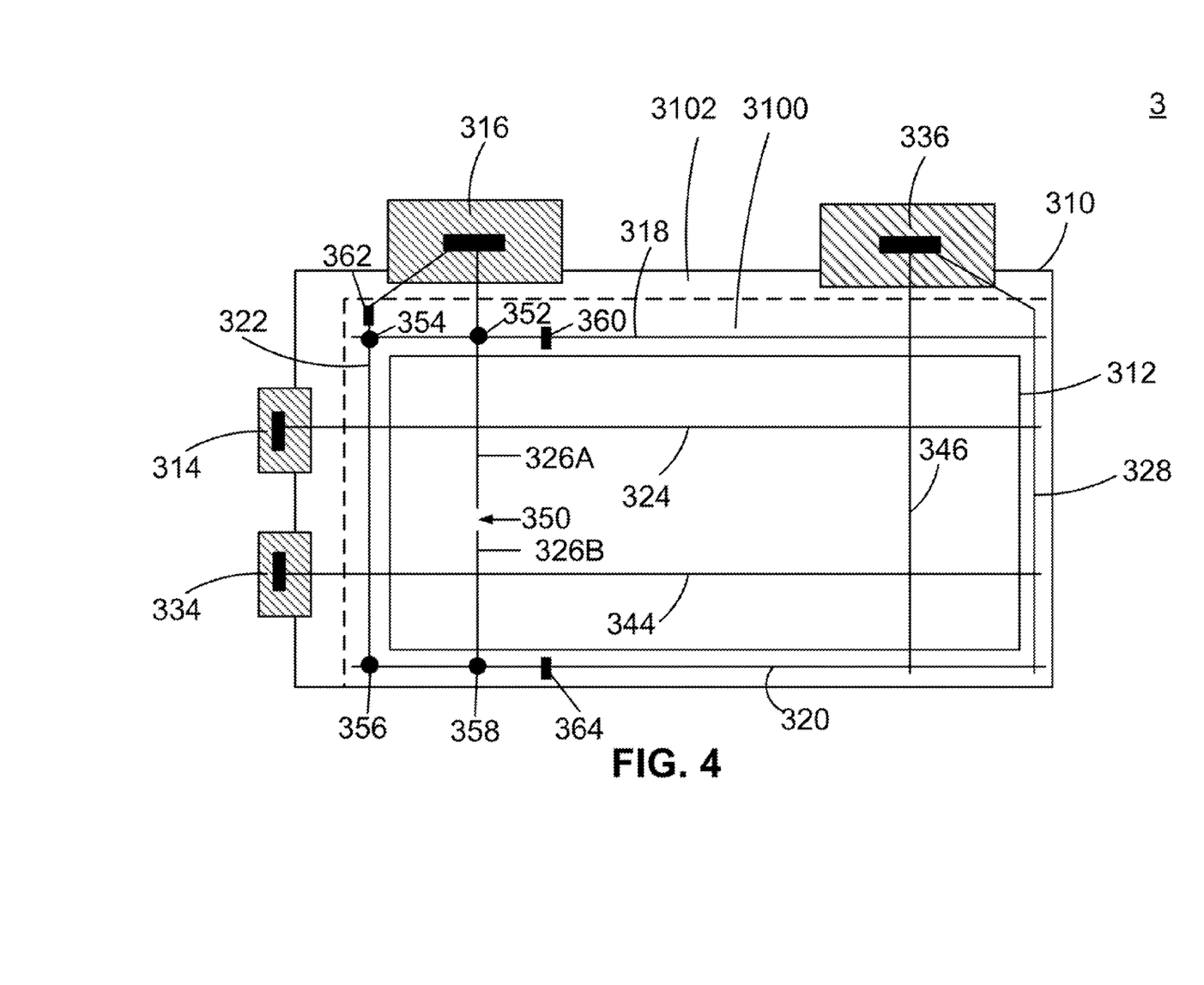
FIG. 4 is a diagram illustrating repairing a source line in the display device of the present invention.

Please refer to FIG. 4, which is a diagram illustrating repairing the source line 326 in the display device 3 of the present invention. When the source line 326 has a defect 350 (e.g. a disconnected point), the source line 326 are divided into a first source line section 326A and a second source line section 326B. The first source line section 326A and the second source line section 326B are discrete. The first source line section 326A still can receive signals of the source driver unit 316, but the second source line section 326B fails to receive the signals of the source driver unit 316 owing to the detect 350. As a result, the image quality of the display device 3 will be affected because the second source line section 326B fails to receive correct data.

To transmit the signals of the source driver unit 316 to the second source line section 326B, a repairing method is to electrically connect the first source line section 326A to the first repair line 318, the second source line section 326B to the second repair line 320, the first dummy line 322 to the first repair line 318, and the first dummy line 322 to the second repair line 320. As a result, the second source line section 326B can receive the signals from the source driver unit 316 via the first repair line 318, the first dummy line 322, and the second repair line 320. A sequence of electrically connecting is not limited. A method for electrically connecting, for example, is to weld at an overlapping position (i.e. a welding point 352) between the first source line section 326A and the first repair line 318, an overlapping position (i.e. a welding point 354) between the first dummy line 322 and the first repair line 318, an overlapping position (i.e. a welding point 356) between the first dummy line 322 and the second repair line 320, and an overlapping position (i.e. a welding point 358) between the second source line section 326B and the second repair line 320. Accordingly, not only the first source line section 326A can receive the signals from the source driver unit 316, but also the second source line section 326B can receive the signals from the source driver unit 316 via the first repair line 318, the first dummy line 322, and the second repair line 320.

The next step is to cut the first repair line 318 and the second repair line 320, and to electrically disconnect the first dummy line 322 from the source driver unit 316, so that the first source line section 326A can be electrically connected to the second source line section 326B via a portion of the first repair line 318, a first dummy line 322, and a portion of the second repair line 320. In the present embodiment, the right side of the welding point 352 (i.e. a cutting point 360) is cut, the first dummy line 322 is electrically disconnected from the source driver unit 316 (i.e. a cutting point 362), the right side of the welding point 358 (i.e. a cutting point 364) is cut, so that the second source line section 326B can receive the signals from the source driver unit 316 via the first repair line 318, the first dummy line 322, and the second repair line 320 without affecting the signals of the source line 346. A method for cutting and electrically disconnecting is to cut at the cutting points 360, 362, 364 by laser. It is noted that in another embodiment, cutting and electrically disconnecting (such as cutting by laser) can be first implemented and then electrically connecting (such as welding by laser) in the repair processes. The sequence of cutting and disconnecting and the sequence of the electrically connecting can be switched.

Further, in another embodiment, a repairing method is to electrically connect the first source line section 326A to the first repair line 318, the second source line section 326B to the second repair line 320, the second dummy line 328 to the first repair line 318, and the second dummy line 328 to the second repair line 320. As a result, the second source line section 326B can receive the signals from the source driver unit 316 via the first repair line 318, the second dummy line 328, and the second repair line 320.

Figure 5:
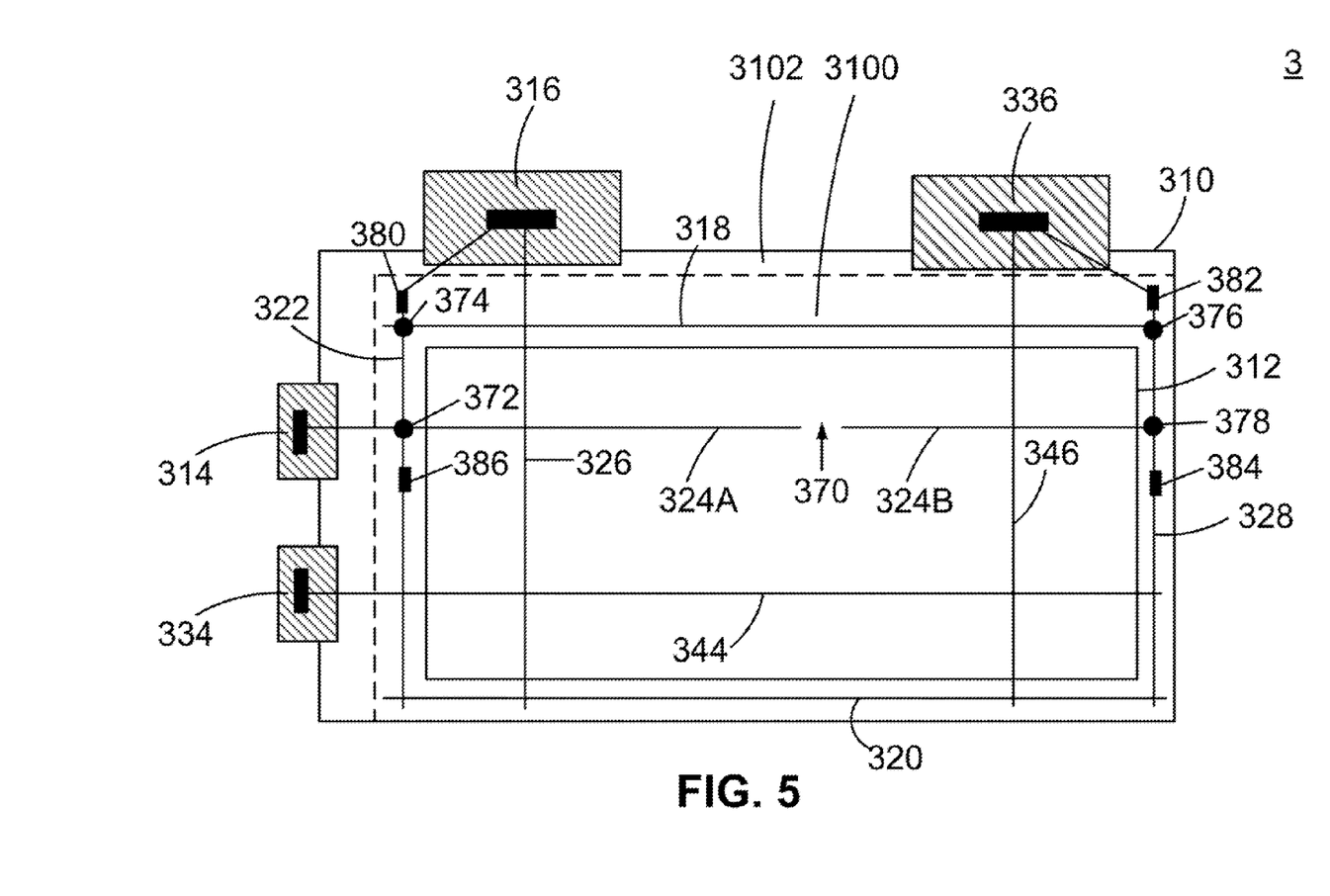
FIG. 5 is a diagram illustrating repairing a gate line in the display device of the present invention.

Please refer to FIG. 5, which is a diagram illustrating repairing the gate line 324 in the display device 3 of the present invention. When the gate line 324 has a defect 370 (e.g. a disconnected point), the gate line 324 are divided into a first gate line section 324A and a second gate line section 324B. The first gate line section 324A and the second gate line section 324B are discrete. The first gate line section 324A still can receive signals of the gate driver unit 314, but the second gate line section 324B fails to receive the signals of the gate driver unit 314 owing to the detect 370. As a result, the image quality of the display device 3 will be affected because the second gate line section 324B fails to be driven.

To transmit the signals of the gate driver unit 314 to the second gate line section 324B, a repairing method is to electrically connect the first gate line section 324A to the first dummy line 322, the second gate line section 324B to the second dummy line 328, the first dummy line 322 to the first repair line 318, and the second dummy line 328 to the first repair line 318. As a result, the second gate line section 324B can receive the signals from the gate driver unit 314 via the first dummy line 322, the first repair line 318, and the second dummy line 328. A sequence of electrically connecting is not limited. A method for electrically connecting, for example, is to weld at an overlapping position (i.e. a welding point 372) between the first gate line section 324A and the first dummy line 322, an overlapping position (i.e. a welding point 374) between the first dummy line 322 and the first repair line 318, an overlapping position (i.e. a welding point 376) between the first repair line 322 and the second dummy line 328, and an overlapping position (i.e. a welding point 378) between the second dummy line 328 and the second gate line section 324B. As a result, not only the first gate line section 324A can receive the signals from the gate driver unit 314, but also the second gate line section 324B can receive the signals from the gate driver unit 314 via the first dummy line 322, the first repair line 318, and the second dummy line 328.

The next step is to electrically disconnect the first dummy line 322 from the source driver unit 316 and the second dummy line 328 from the source driver unit 336, and to cut the first dummy line 322 and the source driver unit 316, so that the first gate line section 324A can be electrically connected to the second gate line section 326B via a portion of the first dummy line 322, a first repair line 318, and a portion of the second dummy line 320. In the present embodiment, the first dummy line 322 is electrically disconnected from the source driver unit 316 (i.e. a cutting point 380), the second dummy line 328 is electrically disconnected from the source driver unit 336 (i.e. a cutting point 382), a position below the welding point 378 (i.e. a cutting point 384) is cut, and a position below the welding point 372 (i.e. a cutting point 386) is cut, so that the second gate line section 326B can receive the signals from the gate driver unit 314 via the first dummy line 322, the first repair line 318, and the second dummy line 328 without affecting the signals of the gate line 344. A method for cutting and electrically disconnecting is to cut at the cutting points 380, 382, 384, 386, by laser. It is noted that in another embodiment, cutting and electrically disconnecting (such as cutting by laser) can be first implemented and then electrically connecting (such as welding by laser) in the repair processes. The sequence of cutting and disconnecting and the sequence of the electrically connecting can be switched.

Further, in another embodiment, a repairing method is to electrically connect the first gate line section 324A to the first dummy line 322, the second gate line section 324B to the second dummy line 328, the second repair line 320 to the first dummy line 322, and the second repair line 320 to the second dummy line 328. As a result, the second gate line section 324B can receive the signals from the gate driver unit 314 via the first dummy line 322, the second repair line 320, and the second dummy line 328.

It is noted that the first dummy line 322 and the second dummy line 328 are respectively disposed at two sides of the pixel array 312 and electrically connected to the source driver units 316, 336. Although the first dummy line 322 and the second dummy line 328 are disposed on the display area 3100, the first dummy line 322 and the second dummy line 328 do not have a function of displaying images. That is, the first dummy line 322 and the second dummy line 328 are not electrically connected to the pixels (not shown) of the pixel array 312. The first dummy line 322 and the second dummy line 328 are electrically connected only to dummy pixels (not shown). The dummy pixels (not shown) are disposed on the outermost periphery of the pixel array 312 and do not have the function of displaying the images. The dummy pixels (not shown) are utilized for decreasing noise around the pixel array 312, i.e. decreasing an influence of the noise on the pixels (not shown) of the pixel array 312. The first dummy line 322 and the second dummy line 328 can be regarded as dummy data lines before they function as auxiliary repair lines. The first dummy line 322 and the second dummy 328 make the images displayed by the pixel array 312 more stable by receiving voltages provided by the source driver units 316, 336. After the first dummy line 322 and the second dummy line 328 function as the auxiliary repair lines, they will be electrically disconnected from the source driver units 316, 336, and accordingly will not function as the dummy data lines.

The display device 3 according to the present invention utilizes the first dummy line 322 and the second dummy line 328 as the auxiliary repair lines, so that a signal transmission is not required to go around the outmost periphery of the gate driver units 314, 334. As a result, signal attenuation can be decreased effectively, especially in a larger size display panel.

Figure 6:
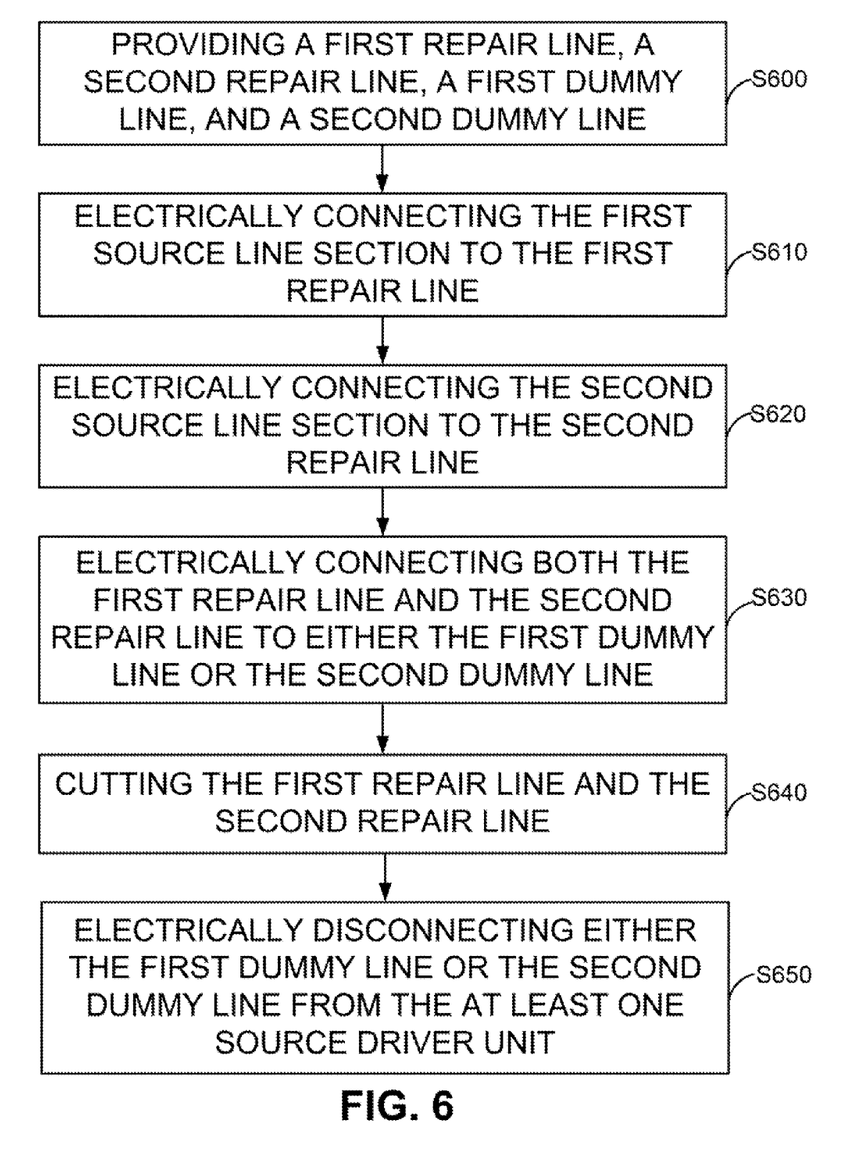
FIG. 6 illustrates a flow chart of a repairing method for a display device according to the present invention.

Please refer to FIG. 6, which illustrates a flow chart of a repairing method for a display device according to the present invention. The display device comprises a pixel array, at least one gate driver unit, and at least one source driver unit. The pixel array comprises a plurality of gate lines and a plurality of source lines. One of the source lines is divided into a first source line section and a second source line section. The first source line section and the second source line section are discrete. The first source line section is electrically connected to the at least one source driver unit. The repairing method comprises steps below.

In step 600, a first repair line, a second repair line, a first dummy line, and a second dummy line are provided. The first repair line is disposed between the pixel array and the at least one source driver unit. The first repair line crosses the source lines and in an initial state is electrically insulated from the source lines. The second repair line is disposed opposite to the first repair line on the pixel array. The second repair line crosses the source lines and in an initial state is electrically insulated from the source lines. The first dummy line is disposed at one side of the pixel array. The first dummy line crosses the gate lines, the first repair line, and the second repair line, and the first dummy line in an initial state is electrically insulated from the gate lines, the first repair line, and the second repair line. The second dummy line is disposed opposite to the first dummy line on the pixel array. The second dummy line crosses the gate lines, the first repair line, and the second repair line, and the second dummy line in an initial state is insulated from the gate lines, the first repair line, and the second repair line.

In step S610, the first source line section is electrically connected to the first repair line.

In step S620, the second source line section is electrically connected to the second repair line.

In step S630, both the first repair line and the second repair line are electrically connected to either the first dummy line or the second dummy line.

In step S640, the first repair line and the second repair line are cut, so that the first source line section is electrically connected to the second source line section via a portion of the first repair line, either the first dummy line or the second dummy line, and a portion of the second repair line.

In the above-mentioned steps S610~S630, a method for electrically connecting is to weld by laser. Further, in the step S640, a method for cutting is by laser.

In one embodiment, either the first dummy line or the second dummy line is electrically connected to the at least one source driver unit, and the repairing method further comprises: in step S650, either the first dummy or the second dummy line is electrically disconnected from the at least one source driver unit. A method for electrically disconnecting is to cut by laser.

Figure 7:
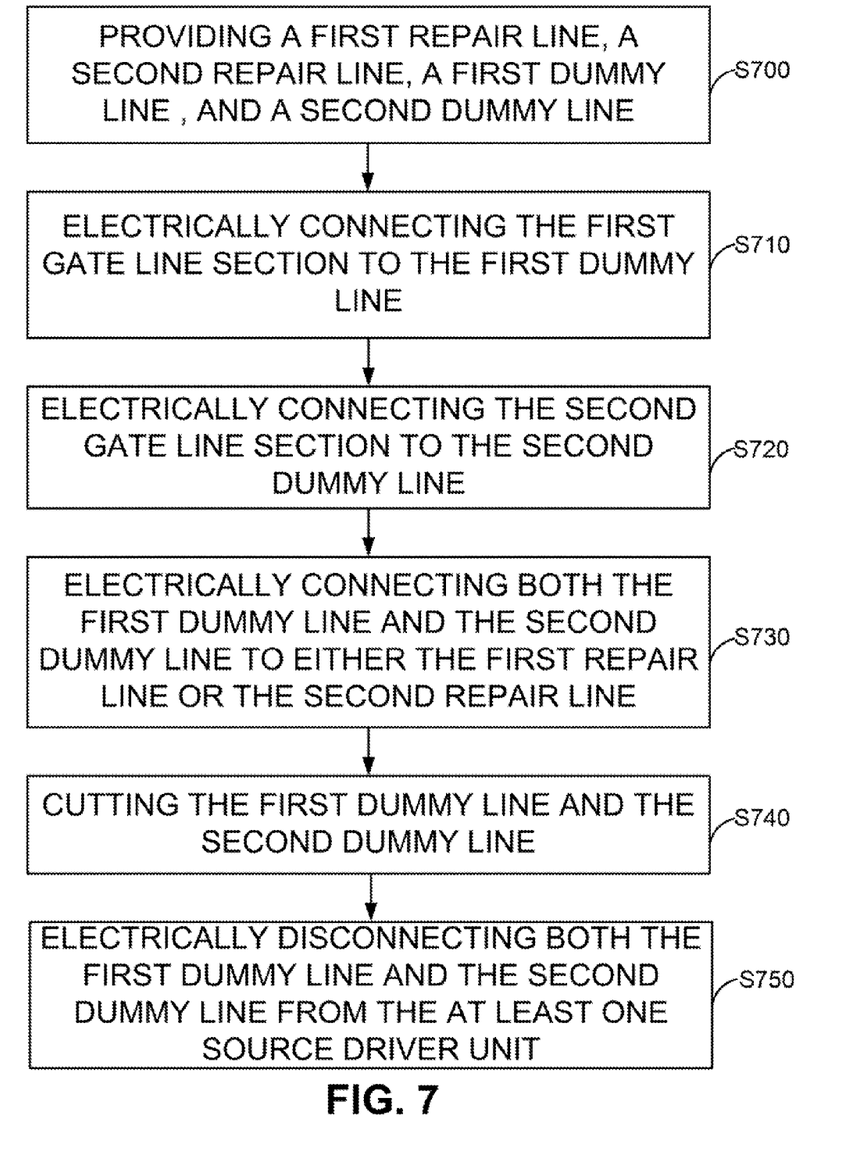
FIG. 7 illustrates a flow chart of another repairing method for a display device according to the present invention.

Please refer to FIG. 7, which illustrates a flow chart of another repairing method for a display device according to the present invention. The display device comprises a pixel array, at least one gate driver unit, and at least one source driver unit. The pixel array comprises a plurality of gate lines and a plurality of source lines. One of the gate lines is divided into a first gate line section and a second gate line section. The first gate line section and the second gate line section are discrete. The first gate line section is electrically connected to the at least one gate driver unit. The repairing method comprises steps below.

In step 700, a first repair line, a second repair line, a first dummy line, and a second dummy line are provided. The first repair line is disposed between the pixel array and the at least one source driver unit. The first repair line crosses the source lines and in an initial state is electrically insulated from the source lines. The second repair line is disposed opposite to the first repair line on the pixel array. The second repair line crosses the source lines and in an initial state is electrically insulated from the source lines. The first dummy line is disposed at one side of the pixel array. The first dummy line crosses the gate lines, the first repair line, and the second repair line, and the first dummy line in an initial state is electrically insulated from the gate lines, the first repair line, and the second repair line. The second dummy line is disposed opposite to the first dummy line on the pixel array. The second dummy line crosses the gate lines, the first repair line, and the second repair line, and the second dummy line in an initial state is insulated from the gate lines, the first repair line, and the second repair line.

In step S710, the first gate line section is electrically connected to the first dummy line.

In step S720, the second gate line section is electrically connected to the second dummy line.

In step S730, the first dummy line and the second dummy line are electrically connected to either the first repair line or the second repair line.

In step S740, the first dummy line and the second dummy line are cut, so that the first gate line section is electrically connected to the second gate line section via a portion of the first dummy line, either the first repair line or the second repair line, and a portion of the second dummy line.

In the above-mentioned steps S710~S730, a method for electrically connecting is to weld by laser. Further, in the step S740, a method for cutting is by laser.

In one embodiment, the first dummy line and the second dummy line are electrically connected to the at least one source driver unit, and the repairing method further comprises: in step S750, the first dummy line and the second dummy line are electrically disconnected from the at least one source driver unit. A method for electrically disconnecting is to cut by laser.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A display device, comprising:
    a substrate comprising a display area and a non-display area;
    a pixel array disposed on the display area, the pixel array comprising a plurality of gate lines and a plurality of source lines;
    at least one gate driver unit disposed on the non-display area for driving the gate lines;
    at least one source driver unit disposed on the non-display area for providing display data to the source lines;
    a first repair line disposed between the pixel array and the at least one source driver unit, the first repair line crossing the source lines and in an initial state electrically insulated from the source lines;
    a second repair line disposed opposite to the first repair line on the pixel array, the second repair line crossing the source lines and in an initial state electrically insulated from the source lines;
    a first dummy line disposed at one side of the pixel array and electrically connected to the at least one source driver unit, the first dummy line crossing the gate lines, the first repair line, and the second repair line, and the first dummy line in an initial state electrically insulated from the gate lines, the first repair line, and the second repair line; and
    a second dummy line disposed opposite to the first dummy line on the pixel array and electrically connected to the at least one source driver unit, the second dummy line crossing the gate lines, the first repair line, and the second repair line, and the second dummy line in an initial state electrically insulated from the gate lines, the first repair line, and the second repair line;
    wherein the first dummy line and the second dummy line are served as dummy data lines for receiving data voltages provided by the at least one source driver unit in the initial state before the first dummy line and the second dummy line are served as auxiliary repair lines, so as to stabilize an image displayed by the pixel array; and
    the auxiliary repair lines comprising the first dummy line and the second dummy line in a secondary state comprise a connection between the first repair line, the second repair line, and at least one of the first dummy line and the second dummy line, such that the at least one of the first dummy line and the second dummy line is disconnected from the at least one source driver unit in the secondary state.

2. The display device of claim 1, wherein the first dummy line is disposed between the pixel array and the at least one gate driver unit.

3. The display device of claim 1, wherein the first dummy line is disposed on the display area.

4. The display device of claim 1, wherein the second dummy line is disposed on the display area.

* * * * *